United States Patent

[11] 3,603,877

| [72] | Inventors | Jury Alexandrovich Alexeev<br>Zheleznovodskaya ul., 21, kv. 6;<br>Boris Abelevich Seliber, Rentgena, 15/31, kv.53; Vladimir Bakirovich Usmanov,<br>Bolshaya Porokhovskaya, 41, kv. 33, all of Leningrad, U.S.S.R. |
|---|---|---|
| [21] | Appl. No. | 834,639 |
| [22] | Filed | June 19, 1969 |
| [45] | Patented | Sept. 7, 1971 |

[54] LIGHT-CONTACT PHOTOSENSITIVE MEASURING INSTRUMENT WITH SCALE RANGE INDICATORS
5 Claims, 7 Drawing Figs.

[52] U.S. Cl. .................................................... 324/97, 324/115
[51] Int. Cl. .................................................... G01r 13/38, G01r 15/08
[50] Field of Search ........................................... 324/97, 96, 115

[56] References Cited
UNITED STATES PATENTS
| 2,550,936 | 5/1951 | Poirette .................... | 324/115 X |
| 3,271,677 | 9/1966 | Peter et al ................. | 324/97 X |

*Primary Examiner*—Alfred E. Smith
*Attorney*—Waters, Roditi, Schwartz & Nissen

ABSTRACT: A light-contact measuring instrument comprising a movement with a rotatable mirror for directing a light beam through an optical system producing pointer beams, of which a major pointer beam is projected onto a scale and an auxiliary pointer beam onto light-sensitive elements capable of moving along the scale, in which the light-sensitive elements are disposed on flexible bands associated with driving means for moving the bands along the scale and carrying current leads disposed along the bands for connecting the light-sensitive elements to an external control circuit.

LIGHT-CONTACT PHOTOSENSITIVE MEASURING INSTRUMENT WITH SCALE RANGE INDICATORS

The invention relates to light-spot measuring instruments and is more particularly concerned with light-contact switchboard instruments intended for measuring, control and signalling.

Light-spot measuring instruments comprising a movement having a mirror, a light source, an optical system generating pointer beams, a graduated scale, and one or more light-sensitive elements connected to an external control or signal unit are already known. The pointer beam in such instruments is generated as a major and an auxiliary pointer beam being moved simultaneously when the mirror of the instrument movement is turned upon a change of the measured value. The major pointer beam moves over the scale in the from of a light ray and serves for indicating the measured value, whereas the auxiliary pointer beam falls upon light-sensitive elements which results in generating an electrical signal used for signalling or control of the value to be measured. The magnitude of the measured value at which the described light-contact unit operates (control range) is determined by the position of the light-sensitive elements with regard to the scale divisions. The change of the control range is effected by moving the light-sensitive elements along the scale on guides. This is usually done manually without having to open the instrument as shown, for example, in U.S. Pat. No. 3,271,677.

The known light-contact measuring instruments are disadvantageous in that the components for mounting light-sensitive elements and for moving them along the scale when adjusting the appropriate control range are very complicated.

Another disadvantage of the known instruments consists in the difficulty of obtaining a continuous output signal from the light-contact unit. When adjusting the control range at any scale division it is necessary to use an auxiliary pointer beam, the length of which is nearly equal to that of the full scale. In such instruments a diaphragm image is projected upon the scale at a great enlargement factor, which results in a considerable decrease of the light spot brightness or requires the employment of more powerful lamps functioning at voltages generating excessive heat.

The first disadvantage makes it difficult to observe the light spot and decreases the operational reliability of the light-contact unit under the influence of diffused light penetrating into the instrument from the exterior thereof, whereas the second disadvantage is conductive in considerably decreasing the lamp life, which requires frequent replacement of the lamps and considerably diminishes the instrument reliability.

Furthermore connection of movable light-sensitive elements with the stationary parts of the circuit in the known instruments is frequently effected by means of a contact sliding on guides.

This method of connecting movable light-sensitive elements to stationary parts of the measuring instruments creates the disadvantage of providing relatively low reliability for the electrical contact, which can fail because or oxidation of wear of the contact surfaces.

There are also known instruments in which the connection of the light-sensitive elements to the electrical circuit is by means of thin flexible current leads which may be for instance, wires twisted into a spiral shape. The drawback of such connections becomes particularly evident in instruments having several light-sensitive elements being moved along a long scale. In this case, the current leads are frequently bent, which may result in their breaking. In addition, as the current leads are frequently rather long, they may occasionally interfere with the light beam. It is also possible that the current leads belonging to the same or to different light-sensitive elements may be entangled or twisted.

Accordingly, it is an object of this invention to provide a light-spot light-contact measuring instrument in which provision is made for the reliable mounting of light-sensitive elements and their convenient movement along the scale in order to obtain a proper control range setting.

Another object of the invention is to provide a light-spot, light-contact measuring instrument, the reliability of which is increased by increasing the light source life without adversely affecting the instrument characteristics.

Still another object of this invention is to provide a fixed electrical contact for a movable light-sensitive element with a stationary part of the electric circuit in the light-spot measuring instrument.

The above and other objects, features and advantages of the invention will be more readily understood from the following detailed description of embodiments of the invention given by way of illustrative examples only and with reference to the accompanying drawings.

In accordance with the invention the above objects are achieved by mounting the light-sensitive elements on flexible bands to be moved along the scale by driving means, said bands having current leads disposed along the bands and which connect the light-sensitive elements to an external control unit.

The light-sensitive elements mounted on the bands are connected in parallel by current leads and are disposed on the bands at equal distances, so that each auxiliary pointer beam can simultaneously act upon only two light-sensitive elements.

A flexible elastic film formed from insulating material which is moved by a gear system is used as the band.

In one embodiment of the invention a first of the band can move freely when the band is being moved by the driving means, whereas the other end of the band is bent into a loop shape and fastened to a stationary part of the instrument and with this other end being constantly connected to fixed conductive elements.

In another form of the invention the entire bands are moved by the driving means and are associated with and connected to stationary conductive elements by conductive springs tightening the bands and which are connected to the current leads.

The present invention will be better understood from the description of exemplary embodiments with reference to the accompanying drawings, in which.

Figure 1:
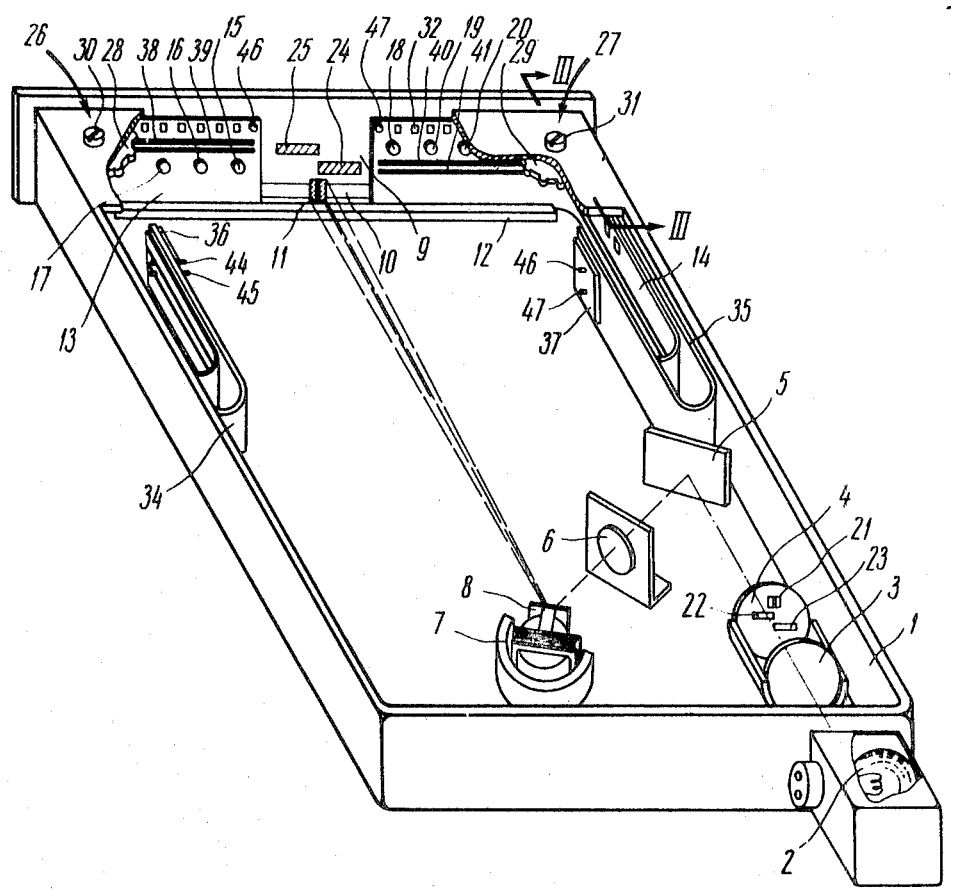
FIG. 1 shows a perspective view of a switchboard light-spot measuring instrument according to the invention.

The instrument comprises a case 1 (FIGS. 1, 2, 3), a light source 2, and an optical system for generating pointer beams, said optical system including a condenser lens 3, a diaphragm 4, a stationary mirror 5 and an objective lens 6. In addition, the instrument comprises an instrument movement 7 supporting a rotatable mirror 8. An opaque scale 9 has a translucent portion 10, whereon is generated a major pointer beam 11 from light source 2. Between the scale 9 and an opaque guide 12 there are disposed moveable flexible bands 13 and 14 having pluralities of light-sensitive elements (photoresistors) 15, 16, 17 and 18, 19, 20, respectively, disposed thereon at different levels.

In addition to an aperture 21 for producing the major pointer beam 11, the diaphragm 4 is also provided with apertures 22 and 23 for producing auxiliary pointer beams 24, 25. When the rotatable mirror 8 of the movement 7 is turned, the auxiliary pointer beams 24, 25 move along the scale 9 simultaneously with the major pointer beam 11, said pointer beam 24 acting upon the photoresistors 15, 16 and 17, whereas the pointer beam 25 acts upon the photoresistors 18, 19 and 20.

Movement of bands 13 and 14 is effected by driving means 26 and 27 which comprises gear wheels 28 and 29 and, associated therewith, adjusting screws 30 and 31, respectively. The bands 13 and 14 have perforation 32 adapted to be engaged by the gear wheels 28 and 29.

Figure 2:
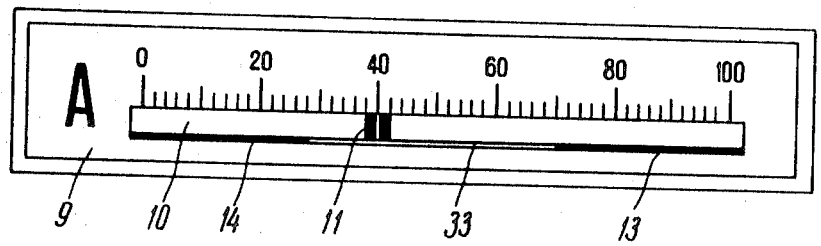
FIG. 2 shows the front panel of the instrument of FIG. 1.
Figure 3:
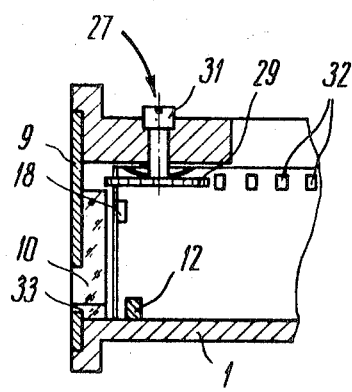
FIG. 3 is a sectional view of the instrument taken along line A—A of FIG. 1.

When moving the bands 13 and 14 the operator can observe their position in relation to the scale 9 through a transparent part 33 (FIGS. 2 and 3).

At the sidewalls of the instrument case 1 provision is made for "pockets" 34 and 35 which accommodate the ends of bands 13 and 14, which are bent into loops and fastened to stationary plates 36 and 37 on the instrument.

Figure 4:
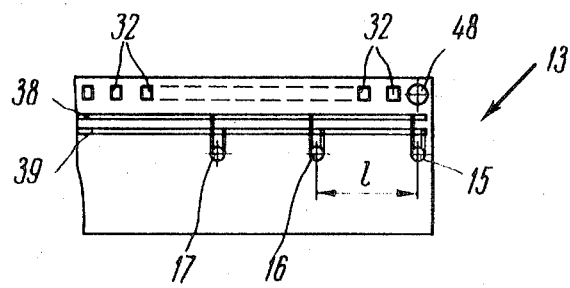
FIG. 4 shows a flexible band with light-sensitive elements thereon.

Current leads 38, 39 and 40, 41 (FIGS. 1,4), which may consist of, for instance metal foil strips, and which are isolated from each other are mounted along each band 13 and 14. Bands 13 and 14 may have other constructions wherein, for example, 53 the current leads 38, 39, 40 and 41 can be formed by depositing small metal particles onto the surface of the elastic flexible bands 13, 14 the latter of which are made of an insulating material.

The photoresistors 15, 16, 17 and 18, 19, 20 are secured to the bands 13 and 14 and spaced equal distances apart, and are electrically connected through their contacts to the current leads 38, 39, 40 and 41 so that in each group the photoresistors 15, 16, 17 and 18, 19, 20 are connected in parallel.

Figure 5:
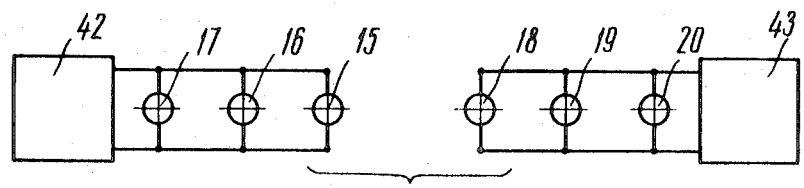
FIG. 5 is a connection diagram of the light-sensitive elements and external control circuits.

The parallel group of the photoresistors 15, 16 and 17 is connected to an external control unit 42 (FIG.5), whereas the parallel group of resistors 18, 19 and 20 is connected to a second external control unit 43.

Figure 6:
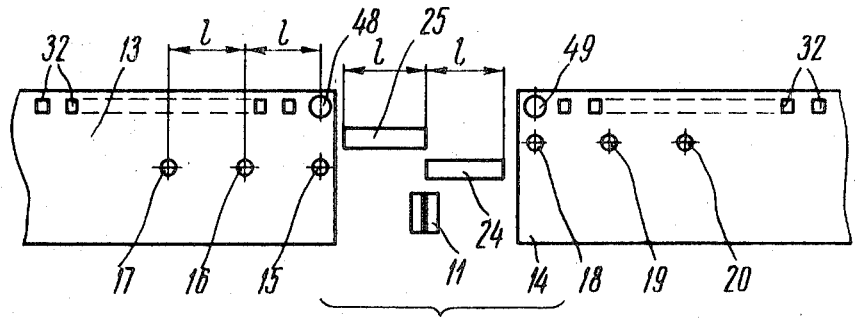
FIG. 6 illustrates the cooperation of the light-sensitive elements with pointer beams.

According to the invention the distance $l$ (FIGS. 4, 6, 8) between the photoresistors is selected to be equal to the length of the auxiliary pointer beams 24 and 25, so that when the pointer beams 24 and 25 move the number of illuminated photoresistors should not exceed two and be less than one. By decreasing the distance between the photoresistors (and, correspondingly, increasing the number of the photoresistors) we can make the length of the auxiliary pointer beams small enough to ensure a sufficient brightness for all the pointer beams without increasing the power of the light source. In view of the foregoing, we can obtain a bright light spot on the instrument scale utilizing relatively low electrical power and durable light source and provide for precise operation of the light-contact unit.

The current leads 38, 39, 40 and 41 on the fixed ends of the bands 13 and 14 are soldered or welded to fixed contacts 44, 45, 46 and 47 secured to plates 36 and 37. The contacts 44, 45, 46 and 47 are connected in a known manner, for instance, by means of wires (not shown) to external units.

When setting the proper control range the operator turns the screw 30 or 31 and by rotating the gear wheels 28 or 29 moves the bands 13, 14 along the scale. The bands 13, 14 are provided with stop means 48 and 49, which bear against gear wheels 28 and 29 so as to prevent the disengagement of the bands. The band loops travel within the "pockets" 34 and 35 without disturbing the mechanical connection of the band ends and the electrical connection of the current leads 38, 39, 40 and 41 with contacts 44, 45, 46 and 47 secured to the plates 36 and 37. Thus the present invention provides a constant and fixed electrical contact of the movable photoresistors with the stationary parts of the instrument.

Upon a change of the value being measured, the light spot 11 moves along the scale. Simultaneously with the movement of the spot 11, there is movement of the light spot pointer beams 24 and 25. The position of the pointer beams shown in FIG. 6 corresponds to the case, when the measured value is within the set control range.

When the measured value is increased the pointer beams move to the left in FIG. 1,6 and to the right in FIG. 2. The pointer beam 24 impinges upon the photoresistor 15 whose resistance will be reduced and an electrical signal will be generated at the control unit 42. The control unit 42 transforms this signal into a control signal for the object to be controlled.

If the measured value changes to the extent that the pointer beam 11 sweeps to the end of the scale, the beam 24, by travelling in sequence over the paralleled photoresistors 15, 16 and 17 will at any given moment illuminate at least one of them, and in response thereto the control unit 42 will receive a continuous signal.

Similarly, when the measured value decreases to below the set limit of the control range, the pointer beam will move to the right in FIG. 1, and to the left in FIG. 2 and the beam 25 will sequentially illuminate the parallel photoresistors 18, 19 and 20, so that the control unit 43 will receive a continuous signal.

The herein described instrument also provides for visual signalling when the value being measured exceeds the set control range. For this purpose the bands 13 and 14 are, at least partially, in the region of travel of the major pointer beam made of a transparent colored material, so that when the pointer beam 11 moving over the scale passes through the bands 13 or 14 it automatically changes its color.

The bands 13 and 14 can be of different colors for instance green or red, whereby the light spot 11 will change from white (when the measured value is within the set control range) to green or red, when the measured value will be below or in excess of the permissible values, respectively.

Figure 7:
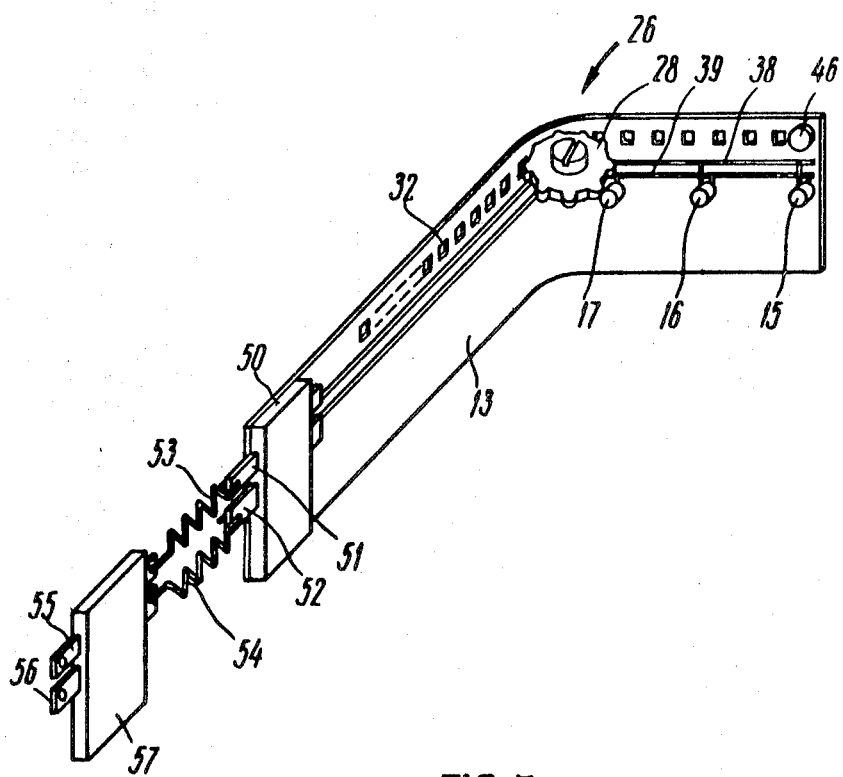
FIG. 7 is a possible connection form of the light-sensitive elements to stationary parts of the instrument electric circuit.

The invention can be also embodied, as shown diagrammatically in FIG. 7, in which the band 13 carrying the photoresistors 15, 16, 17, current leads 38, 39 and the stop unit 48, can be moved by the gear wheel 28 of the driving means 26, which is engaged with the perforation 32.

The end of the band 13 has fastened there to a movable insulating plank 50 having contact buses 51 and 52, to which are secured the terminals of spiral by-wound springs 53 and 54. The other terminals of said springs are connected to contact buses 55 and 56 respectively, which are in turn secured to a fixed insulating plate 57. The stationary contact buses 55 and 56 are connected in a known manner, for instance, through standard leads to the external control units. Thus the springs 53, 54 provide for the simultaneous mechanical and electrical connection of the movable elements of the band with a stationary part of the instrument. During rotation of the gear wheel 28 of the driving means 26, the band 13 moves in conjunction with photoresistors 15, 16 and 17 secured thereon, said photoresistors being constantly connected to the external circuit.

It should be noted that the embodiment shown in FIG. 7 is particularly suitable for application when the control range changes within comparatively small limits and the springs 54, 55 operate within their elastic strain range.

It should be apparent to one skilled in the art that the forms of the invention illustrated in the drawings and described above is only exemplary of spirally wound and preferable embodiments thereof. Various modifications and structural changes as to dimensions and arrangement of separate parts can be made without departing in any way from the spirit of the present invention. For instance, the parts shown in the drawing and described above can be replaced by similar ones, the arrangement of separate parts may be changed, separate elements of this invention can be used independently, all of these alterations being within the spirit and scope of the invention as set forth in the appended claims.

What is claimed is:

1. A light-contact measuring instrument, comprising; a light source; a scale; a movement having a rotatable mirror for directing a light beam from said light source onto said scale; optical converter means for producing a major pointer beam projecting onto said scale and at least one auxiliary pointer beam; light-sensitive elements adapted to be acted upon by said auxiliary pointer beam; flexible bands positioned for movement along said scale, said light-sensitive elements being disposed on said bands so as to move in conjunction therewith; driving means for moving said bands along said scale during adjustment of said instrument; and current leads disposed along said bands and connecting said light-sensitive elements to an external electrical circuit, the bands having first ends adapted to freely move when the bands are being moved by said driving means, the other ends of said bands being bent into loop shape and fastened to a stationary portion of said instrument, said current leads being positioned on said loop shaped ends and permanently connected to fixed contacts.

2. A light-contact measuring instrument, comprising; a light source; a scale; a movement having a rotatable mirror for directing a light beam from said light source onto said scale; optical converter means for producing a major pointer beam projecting onto said scale and at least one auxiliary pointer beam; light-sensitive elements adapted to be acted upon by said auxiliary pointer beam; flexible bands positioned for movement along said scale, said light-sensitive elements being disposed on said bands so as to move in conjunction therewith; driving means for moving said bands along said scale during adjustment of said instrument; and current leads disposed along said bands and connecting said light-sensitive elements to an external electrical circuit, the entire bands adapted to be moved by said moving means; stationary conductive elements, electrically conductive tension springs adapted to tighten said bands and to interconnect the latter with said stationary conductive elements, said springs being connected to said current leads.

3. A light-contact measuring instrument comprising a light source; a scale; optical converter means generating a main and auxiliary pointer beams, said main pointer beam being projected onto said scale in the form of a primary light spot; light-sensitive elements being acted upon by said auxiliary pointer beam; flexible bands capable of moving along said scale; said light-sensitive elements being mounted on said flexible bands at equal distances therebetween; and current leads disposed along said bands and connecting said light-sensitive elements in parallel, said auxiliary pointer beam being projected onto the plane of said light-sensitive elements in the form of an auxiliary light spot having a length essentially equal to the distance between the centers of two adjacent light-sensitive elements.

4. A light-contact measuring instrument comprising a light source; a scale; optical converter means generating a main and auxiliary pointer beams, said main pointer beam being projected onto said scale in the form of a light spot; light-sensitive elements being acted upon by said auxiliary pointer beam; a flexible band capable of moving along said scale, said light-sensitive elements being mounted on said flexible band; and current leads disposed along said band and connected to said light-sensitive driving means to move one end of said band when adjusting the instrument, whereas the other end of said band is loop shaped and is fastened to the stationary part of the instrument, the current leads on said other end being continuously connected to the stationary conductive elements.

5. A light-contacting measuring instrument comprising a light source; a scale; an optical converter means generating a main and auxiliary pointer beams, said main pointer beam being projected onto said scale in the form of a light spot; light-sensitive elements being acted upon by said auxiliary pointer beam; a flexible band capable of moving along said scale, said light-sensitive elements being mounted on said flexible band; current leads disposed along said band and connected to said light-sensitive elements; driving means moving said flexible band with said light-sensitive elements along said scale when adjusting the instrument; and conductive springs tightening said band and electrically connected to said current leads, said springs being also connected to the stationary conductive elements.